United States Patent
Yamada

(10) Patent No.: US 9,906,107 B2
(45) Date of Patent: Feb. 27, 2018

(54) MAGNET-FREE ROTATING ELECTRIC MACHINE

(71) Applicant: Toyota Jidosha Kabushiki Kaisha, Toyota-shi Aichi-ken (JP)

(72) Inventor: Eiji Yamada, Owariasahi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 171 days.

(21) Appl. No.: 15/082,742

(22) Filed: Mar. 28, 2016

(65) Prior Publication Data

US 2016/0294267 A1    Oct. 6, 2016

(30) Foreign Application Priority Data

Mar. 31, 2015 (JP) ................................. 2015-072996

(51) Int. Cl.
  *H02K 11/00* (2016.01)
  *H02K 19/12* (2006.01)
  *H02K 16/04* (2006.01)

(52) U.S. Cl.
  CPC ............. *H02K 19/12* (2013.01); *H02K 16/04* (2013.01)

(58) Field of Classification Search
  CPC ........ H02K 16/00; H02K 16/02; H02K 16/04; H02K 19/12; H02K 11/046; H02K 11/042
  USPC .................................. 30/112, 113, 114, 68 D
  See application file for complete search history.

(56) References Cited

U.S. PATENT DOCUMENTS

| 2010/0259136 | A1* | 10/2010 | Hiramoto | H02K 1/223 310/68 D |
| 2011/0241465 | A1* | 10/2011 | Anghel | H02K 7/006 310/114 |
| 2011/0285238 | A1 | 11/2011 | Kusase et al. | |
| 2012/0256510 | A1* | 10/2012 | Yamada | H02K 19/12 310/184 |
| 2013/0334937 | A1* | 12/2013 | Yamada | H02K 19/10 310/68 D |
| 2014/0285057 | A1 | 9/2014 | Aoyama | |

FOREIGN PATENT DOCUMENTS

| EP | 2667494 A1 | 11/2013 |
| JP | S58-116034 A | 7/1983 |
| JP | 2010-279165 A | 12/2010 |
| JP | 2011-244643 A | 12/2011 |
| JP | 2012-130206 A | 7/2012 |

(Continued)

*Primary Examiner* — Hanh Nguyen
(74) *Attorney, Agent, or Firm* — Dinsmore & Shohl LLP

(57) ABSTRACT

A magnet-free rotating electric machine provided with an annular rotor between an outer and inner stators. The annular rotor includes pairs of inner and outer salient poles along a circumferential direction of an annular rotor yoke portion. Each rotor coil is diagonally wound between an inner circumferential surface of the rotor yoke portion on a first side and an outer circumferential surface of the rotor yoke portion on a second side with the pair of inner and outer salient poles sandwiched therebetween. A rectifying device ensures that the magnetic polarities of the inner and outer salient poles magnetized by the current of the rotor coil induced by the excitation of the outer stator and the inner stator are opposite to each other and further that the NS magnetic pole directions of the adjacent pairs of inner and outer salient poles are opposite to each other.

4 Claims, 2 Drawing Sheets

(56) References Cited

FOREIGN PATENT DOCUMENTS

| | | |
|---|---|---|
| JP | 2014-183636 A | 9/2014 |
| JP | 2016-073166 A | 5/2016 |
| JP | 2016-077052 A | 5/2016 |

* cited by examiner

MAGNET-FREE ROTATING ELECTRIC MACHINE

CROSS-REFERENCE TO RELATED APPLICATIONS

This application claims priority to Japanese Patent Application No. 2015-72996, filed on Mar. 31, 2015, the entire disclosure of which is incorporated herein by reference.

BACKGROUND

Technical Field

The present disclosure relates to a magnet-free rotating electric machine, and more particularly to a double-stator type magnet-free rotating electric machine including an outer stator on the outer circumferential side of an annular rotor and an inner stator on the inner circumferential side of the annular rotor.

Related Art

As a magnet-free rotating electric machine having a rotor with no permanent magnets, a rotor structure is well-known in which a rotor is provided with rotor salient poles around which rotor coils are wound such that induced current is generated by the field from a stator and the rotor salient poles are magnetized by this induced current.

JP 2010-279165 A describes that, for a magnet-free rotating electric machine, in addition to prior art methods in which coils are wound around rotor salient poles, another method is available in which coils are wound around a rotor yoke. JP 2010-279165 A also describes a structure in which rotor salient poles include induction coils positioned near a gap with a stator, and separately from these induction coils, common coils are provided away from the stator. JP 2010-279165 A further describes another structure in which induction coils are wound around rotor salient poles and a common coil is wound around a rotor core.

As techniques relating to the present disclosure, JP 2011-244643 A discloses a double-stator type motor in which permanent magnets magnetized in the circumferential direction are positioned around an annular rotor. An inner stator is provided inside the rotor and an outer stator is provided outside the rotor. The inner stator and the outer stator respectively include Y-connected three-phase coils. In this disclosure, the number of magnetic poles of the inner stator and the number of magnetic poles of the outer stator are equal to each other. The permanent magnets disposed on the rotor apply magnetic flux in parallel to both of the inner stator and the outer stator. Magnet-free rotating electric machines are advantageous in costs because expensive magnetic materials are not required. However, because of a risk that the coils wound around the rotor salient poles may be detached from the rotor salient poles due to a centrifugal force of the rotating rotor, structure becomes complicated by use of coil holders or the like for avoiding such detachment. Such a complicated structure limits the space for coil windings, resulting in lowered output efficiency of the rotating electric machine.

SUMMARY

An object of the present disclosure is to provide a magnet-free motor in which coils are not detached from rotor salient poles. Another object of the present disclosure is to provide a magnet-free rotating electric machine which enables improved output while preventing coils from being detached from the rotor.

A magnet free rotating electric machine according to the present disclosure includes an annular outer stator including an outer exciting coil and an annular inner stator including an inner exciting coil. The annular inner stator is formed unitedly with the outer stator and disposed inside the outer stator. The magnet free rotating electric machine further includes an annular rotor disposed between an inner circumferential side of the outer stator and an outer circumferential side of the inner stator. The annular rotor includes an annular rotor yoke portion, and, a plurality of pairs of inner and outer salient poles. The pairs of inner and outer salient poles are disposed along a circumferential direction of the rotor yoke portion. Each of the inner salient poles and each of the outer salient poles are disposed respectively on an inner circumferential side and an outer circumferential side of the rotor yoke portion, and form a pair. The annular rotor further includes rotor coils. Each of the rotor coils is provided for each of the pairs of inner and outer salient poles such that the rotor coil is diagonally wound between an inner circumferential surface of the rotor yoke portion on a first side in the circumferential direction and an outer circumferential surface of the rotor yoke portion on a second side with the pair of inner and outer salient poles sandwiched therebetween. The magnet-free rotating electric machine further includes a rectifying device connected between both ends of the rotor coil. The rectifying device ensures that polarity of an outer magnetic pole, which is an outer salient pole, and polarity of an inner magnetic pole, which is an inner salient pole, are opposite to each other. The outer magnetic pole and the inner magnetic pole are magnetized by induced current in the rotor coil by excitation of the outer stator and the inner stator. The rectifying device ensures that NS magnetic pole directions of circumferentially-adjacent pairs of the inner and outer salient poles are opposite to each other.

In some embodiments of a magnet-free rotating electric machine according to the present disclosure, the rotor coil is wound in multi-layers for a predetermined number of layers along a diagonal direction.

In some embodiments of a magnet-free rotating electric machine according to the present disclosure, a single common rectifying device is used for the pairs of the inner and outer salient poles which have the same NS magnetic pole direction among the plurality of pairs of inner and outer salient poles.

In a magnet-free rotating electric machine according to the present disclosure, pairs of inner and outer salient poles which are respectively provided on the inner circumferential side and the outer circumferential side of an annular rotor are provided. Rotor coils are wound such that each of the rotor coils is diagonally wound between an inner circumferential surface of the rotor yoke portion on a first side in the circumferential direction and an outer circumferential surface of the rotor yoke portion on a second side, with the pair of inner and outer salient poles sandwiched therebetween. An outer stator and an inner stator are respectively provided on the outer circumferential side and the inner circumferential side of the annular rotor. Excitation of each stator causes a flux linkage to rotor coils, and thereby current is induced in the rotor coil. In this way, the pairs of inner and outer salient poles are magnetized to form magnetic poles. Because the annular rotor can generate torque respectively between the annular rotor and the outer stator and between the annular rotor and the inner stator, the output of the magnet-free rotating electric machine can be improved. Further, each rotor coil is not separately wound around the inner salient pole and the outer salient pole of the pair of inner and outer salient poles, but diagonally wound between an inner circumferential surface of the rotor yoke portion on a first side in the circumferential direction and an outer circumferential surface of the rotor yoke portion on a second side at a cross intersection between the pair of inner and outer salient poles and the rotor yoke portion. In this way, detachment of coils from the annular rotor can be prevented.

DETAILED DESCRIPTION

Figure 1:
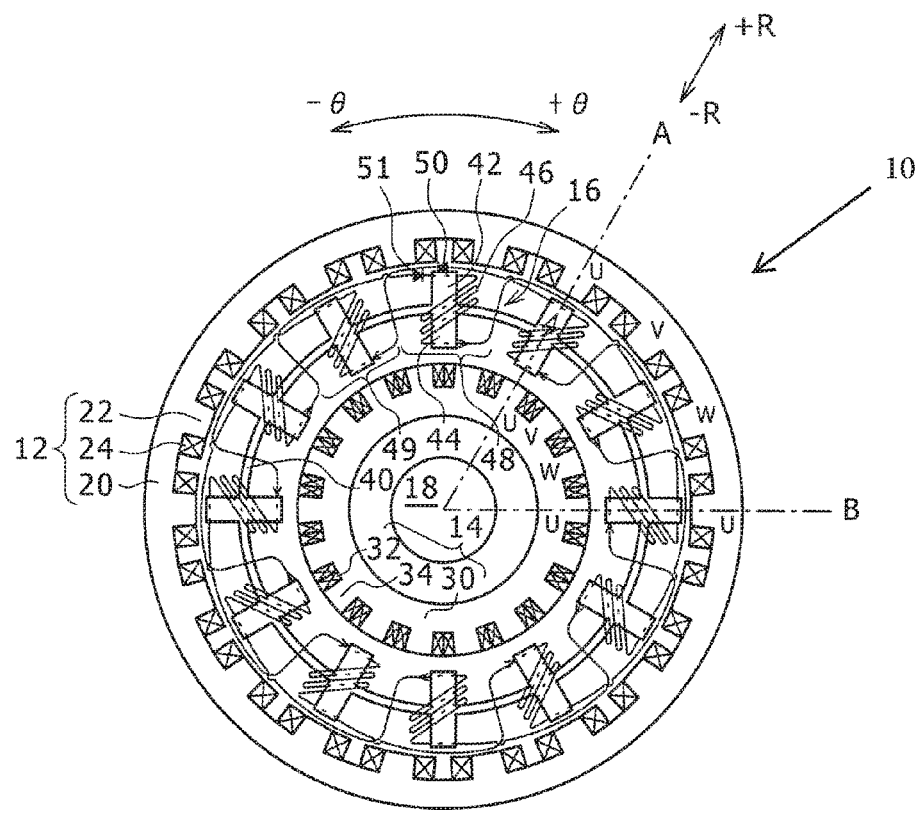
FIG. 1 is a structural diagram of a magnet-free rotating electric machine according to an embodiment of the present disclosure.

Embodiments of the present disclosure are described in detail below by referring to attached drawings. Details in the descriptions below, such as the numbers of poles, salient poles, inner and outer salient poles, windings, and layers in multilayer windings, are provided merely as examples. These details can be modified as required in accordance with the specifications of magnet-free rotating electric machines. The same reference numerals are assigned to similar elements throughout the drawings and redundant descriptions are omitted in the description below.

FIG. 1 is a cross sectional view of a magnet-free rotating electric machine 10 along the plane vertical to an axis direction thereof, showing a structure of the magnet-free rotating electric machine 10. The magnet-free rotating electric machine 10 is hereinafter referred to as "rotating electric machine 10" unless otherwise specified. FIG. 1 shows a circumferential direction (θ direction) and a radial direction (R direction). As shown in FIG. 1, the clockwise direction is the +θ direction and the outward direction from the inner circumferential side to the outer circumferential side is the +R direction.

The rotating electric machine 10 is a three-phase synchronous rotating electric machine without a permanent magnet as a magnetic pole. The rotating electric machine 10 is a double-stator type rotating electric machine including an annular rotor 16, an outer stator 12 disposed on the outer circumferential side of the annular rotor 16 to face the annular rotor 16, an inner stator 14 disposed on the inner circumferential side of the annular rotor 16 to face the annular rotor 16, and an output shaft 18. The outer stator 12 and the inner stator 14 are unitedly fixed through a motor case (not shown). The output shaft 18 is rotatably supported by the motor case. The annular rotor 16 and the output shaft 18 are unitedly formed. The annular rotor 16 rotates in a space between the outer stator 12 and the inner stator 14. The generated torque of the rotating electric machine 10 is output to the output shaft 18.

The annular rotor 16 includes a rotor yoke portion 40, a plurality of pairs of inner and outer salient poles 42, 44, and rotor coils 46.

The rotor yoke portion 40 is an annular magnetic body. The pairs of inner and outer salient poles 42, 44 include, along the circumferential direction of the rotor yoke portion 40, outer salient poles 42 disposed on the outer circumferential side of the rotor yoke portion 40 and inner salient poles 44 disposed on the inner circumferential side of the rotor yoke portion 40. Pairs of the outer salient poles 42 and the inner salient poles 44 protrude opposite to each other in radial directions, with the rotor yoke portion 40 sandwiched therebetween. As described above, the term "pair of inner and outer salient poles 42, 44" refers to the outer salient pole 42 and the inner salient pole 44 in a pair. However, when it is necessary to independently identify the outer salient pole 42 and the inner salient pole 44, they are referred separately as the "outer salient pole 42" and the "inner salient pole 44", not in a pair. In the example shown in FIG. 1, 12 pairs of the inner and outer salient poles 42, 44 are provided along the circumference of the rotor yoke portion 40. The angle between adjacent pairs of inner and outer salient poles 42, 44 is 30 degrees.

The rotor coils 46 are diagonally wound coils such that each rotor coil 46 is wound from one side on the inner circumferential surface of the rotor yoke portion 40 to the opposing side on the outer circumferential surface of the rotor yoke portion 40 with a pair of inner and outer salient poles 42, 44 sandwiched therebetween. In this winding, each coil is not wound around the radial direction of the pair of inner and outer salient poles 42, 44, but a diagonal winding is formed at a cross intersection between the rotor yoke portion 40 and the pair of inner and outer salient poles 42, 44.

In the annular rotor 16, the pairs of inner and outer salient poles 42, 44 are magnetized by induced current generated in the rotor coils 46 by linking the magnetic flux from the exciting coils of the outer stator 12 and the inner stator 14 to the rotor coils 46. The magnetized pairs of inner and outer salient poles 42, 44 serve as magnet-free poles. Among the magnetized pairs of the inner and outer salient poles 42, 44, the magnetized outer salient poles 42 serve as outer magnetic poles facing the outer stator 12, while the magnetized inner salient poles 44 serve as inner magnetic poles facing the inner stator 14. The polarity of the outer magnetic poles 42 and the polarity of the inner magnetic poles 44 are opposite to each other.

One pair of the inner and outer salient poles 42, 44 is also referred to as "magnetic pole pair" because the pair forms an outer magnetic pole and an inner magnetic pole by being magnetized by induced current flowing through the corresponding rotor coil 46. FIG. 1 shows two magnetic pole pairs 48, 49 which are circumferentially adjacent to each other. In these adjacent magnetic pole pairs 48, 49, the NS magnetic pole directions ("S to N" or "N to S") at the pairs of inner and outer salient poles 42, 44 are opposite to each other. In the example shown in FIG. 1, the magnetic polarity of the outer salient pole 42 is S and the magnetic polarity of the inner salient pole 44 is N in the magnetic pole pair 48. Thus, the NS magnetic pole direction of the pair of inner and outer salient poles 42, 44 is S to N from the outer salient pole 42 to the inner salient pole 44. In contrast, in the magnetic pole pair 49, the magnetic polarity of the outer salient pole 42 is N and the magnetic polarity of the inner salient pole 44 is S. Thus, the NS magnetic pole direction of the pair of inner and outer salient poles 42, 44 is N to S from the outer salient pole 42 to the inner salient pole 44. The annular rotor 16 includes 12 pairs of magnetic poles. Because adjacent magnetic pole pairs 48, 49 have opposite NS directions, the 12 pairs of magnetic poles are arranged such that the NS directions from the outer salient pole 42 to the inner salient pole 44 around the annular rotor 16 are "SN", "NS", "SN", "NS", "SN", "NS", "SN", "NS", "SN", "NS", "SN", and "NS".

A rectifying device 50 is a diode which ensures that the polarities of the inner and outer magnetic poles of the magnetic pole pair 48 are opposite to each other. Similarly, a rectifying device 51 is a diode which ensures that the polarities of the inner and outer magnetic poles for the magnetic pole pair 49 are opposite to each other. Further, in order to cause the circumferentially-adjacent magnetic pole pairs 48, 49 to have the opposite NS magnetic pole directions at the pairs of inner and outer salient poles 42, 44, the rectifying devices 50, 51 ensures that the direction of induced current flowing through the rotor coil 46 in one magnetic pole pair 48 and the direction of induced current flowing through the rotor coil 46 in the other magnetic pole pair 49 become opposite to each other.

As described above, the annular rotor 16 includes 12 pairs of magnetic poles. The NS directions from the outer salient poles 42 to the inner salient poles 44 are opposite between adjacent magnetic pole pairs 48, 49, while the polarity directions are the same between every other magnetic pole pairs in the circumferential direction. The NS directions are either "S to N" or "N to S". The rotor coils 46 of the pairs of inner and outer salient poles 42, 44 having the same NS directions of the magnetic poles are connected to each other in series, and a single common rectifying device is provided therewith. In FIG. 1, a single rectifying device 50 is provided for 6 pairs of inner and outer salient poles 42, 44, which have the S to N polarity direction from the outer salient pole 42 to the inner salient pole 44, while the other rectifying device 51 is provided for the remaining 6 pairs of inner and outer salient poles 42, 44, which have the N to S polarity direction.

The outer stator 12 includes two or more outer stator salient poles 22 provided along an annular outer stator yoke portion 20 on the inner circumferential side, and two or more outer exciting coils 24 which are respectively wound around the outer stator salient poles 22. The outer stator salient poles 22 are disposed towards the outer salient pole 42 of the annular rotor 16.

The outer exciting coils 24 are each formed by a U-phase coil, a V-phase coil, or a W-phase coil. FIG. 1 shows a single polarity area, Area (A-B). The angle of Area (A-B) is 60 degrees. Three outer stator salient poles 22 are provided in Area (A-B). The three outer stator salient poles 22 within a single pole area are a U-phase salient pole around which a U-phase coil is wound, a V-phase salient pole around which a V-phase coil is wound, and a W-phase salient pole around which a W-phase coil is wound. FIG. 1 shows positions of the U-phase, V-phase, and W-phase poles corresponding to the three outer stator salient poles 22 in Area (A-B). The total number of the outer stator salient poles 22 is 3/2 times the total number of the outer salient poles 42 of the annular rotor 16, i.e. 18. This can be obtained by Equation "12×(3/2)=18". The U-phase coil, the V-phase coil, and the W-phase coil are respectively wound around the U-phase salient pole, the V-phase salient pole, and the W-phase salient pole with concentrated windings.

The inner stator 14 includes two or more inner stator salient poles 34 provided along an annular inner stator yoke portion 30 on the outer circumferential side, and two or more inner exciting coils 32 which are respectively wound around the inner stator salient poles 34. The inner stator salient poles 34 are disposed towards the inner salient poles 44 of the annular rotor 16.

The inner exciting coils 32 are each formed by a U-phase coil, a V-phase coil, or a W-phase coil. A single polarity area of the inner stator 14 is the same as the single polarity area, Area (A-B), of the outer stator 12. Thus, three inner stator salient poles 34 are provided in Area (A-B). The three inner stator salient poles 34 in Area (A-B) are a U-phase salient pole around which a U-phase coil is wound, a V-phase salient pole around which a V-phase coil is wound, and a W-phase salient pole around which a W-phase coil is wound. FIG. 1 shows positions of the U-phase, V-phase, and W-phase poles corresponding to the three inner stator salient poles 34 in Area (A-B). The total number of the inner stator salient poles 34 is equal to the total number of the outer stator salient poles 22 of the outer stator 12, which is 18. The U-phase coil, the V-phase coil, and the W-phase coil are respectively wound around the U-phase salient pole, the V-phase salient pole, and the W-phase salient pole with concentrated windings.

In the above structure, induced current is generated in the rotor coils 46 of the annular rotor 16 by receiving the field formed by the outer exciting coils 24 of the outer stator 12 and the field formed by the inner exciting coils 32 of the inner stator 14. This induced current magnetizes the outer salient poles 42 to form outer magnetic poles, and also magnetizes the inner salient poles 44 to form inner magnetic poles. The annular rotor 16 is rotated to generate torque resulting from the combination between the formed outer magnetic pole and the field from the outer stator 12 and the combination between the formed inner magnetic pole and the field from the inner stator 14. In this way, although the annular rotor 16 has no permanent magnet, torque can be generated. This is the principle upon which the magnet-free rotating electric machine 10 generates torque.

The annular rotor 16 and the outer stator 12 can function as one rotating electric machine portion and the annular rotor 16 and the inner stator 14 can function as the other rotating electric machine portion. In this way, a single magnet-free rotating electric machine 10 can have two rotating electric machine portions.

Figure 2:
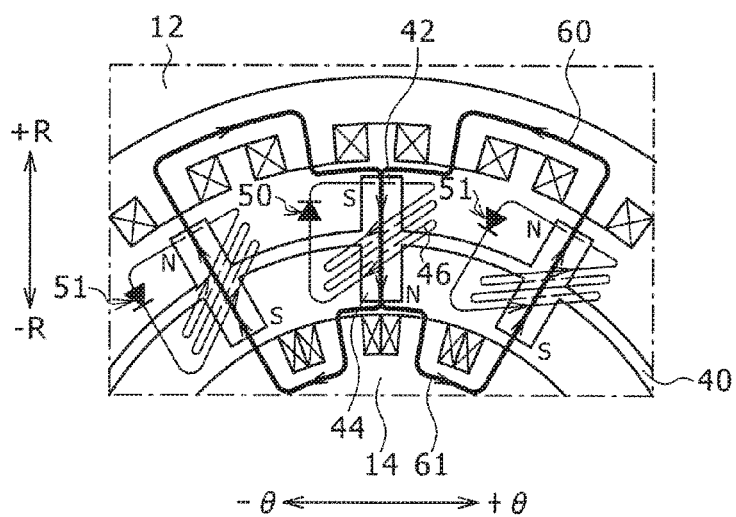
FIG. 2 is diagram enlarging a part of FIG. 1 to show how magnetic flux flows.

FIG. 2 is an enlarged view of three circumferentially-adjacent magnetic pole pairs shown in FIG. 1. By referring to FIG. 2, the flux flow while the magnet-free rotating electric machine 10 is in operation is described. It should be noted that in FIG. 2, in order to facilitate description, it is assumed that a single rectifying device is provided for each of the magnetic pole pairs.

The central magnetic pole pair in FIG. 2 is the magnetic pole pair 48 in FIG. 1. At the pair of inner and outer salient poles 42, 44, induced current is made to flow through the rotor coil 46 by the rectifying device 50, in the direction shown by an arrow. This induced current magnetizes the outer salient pole 42 to an S pole and the inner salient pole 44 to an N pole. At the adjacent magnetic pole pair 49, induced current is made to flow by the rectifying device 51 through the rotor coil 46 in the direction shown by an arrow, which is opposite to the direction of the induced current at the magnetic pole pair 48. This induced current magnetizes the outer salient pole 42 to an N pole and the inner salient pole 44 to an S pole. Field control is performed for the outer stator 12 and the inner stator 14 in accordance with the direction of the magnetic poles of the magnetic pole pairs formed in the annular rotor 16.

A flux flow 60 from the outer stator 12 side flows through the outer salient pole 42 (magnetized to an S pole) of the center pair of inner and outer salient poles 42, 44 towards the inner salient pole 44 (magnetized to an N pole). Then, via the inner stator 14, the flux flow 60 flows through the inner salient poles 44 (magnetized to an S pole) of the adjacent pairs of inner and outer salient poles 42, 44 towards the outer salient poles 42 (magnetized to an N pole), and returns to the outer stator 12 side. This flux flow generates torque between the annular rotor 16 and the outer stator 12 and between the annular rotor 16 and the inner stator 14.

In the above description, each rotor coil 46 is assumed to be wound in a single layer. By winding the rotor coils 46 in multi-layers around the annual rotor 16, the output of the rotating electric machine 10 can be improved in comparison to the output in the single layer.

Figure 3:
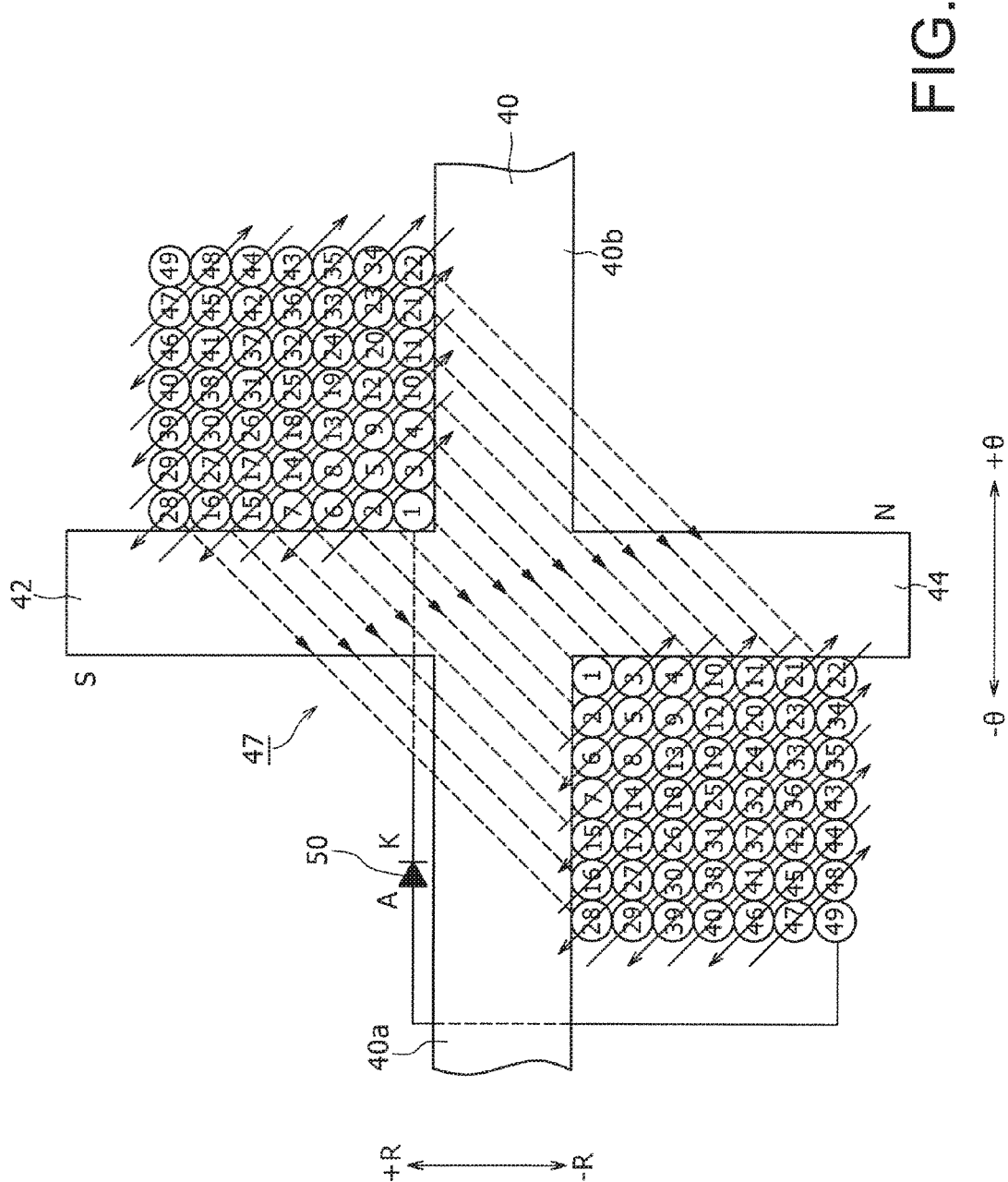
FIG. 3 is a diagram with the rotor coil in FIG. 1 changed to multilayer winding.

FIG. 3 is a view of a single magnetic pole pair 48 enlarged in the θ direction and the R direction so as to show the winding of the multilayer rotor coil 47. FIG. 3 shows the rectifying device 50 which ensures the direction of the induced current flow in the multilayer rotor coil 47 to be unidirectional at the magnetic pole pair 48. The rectifying device 50 is connected between the beginning and the end of the multilayer rotor coil 47.

In the description below, the rotor yoke portion 40 is divided into a rotor yoke portion 40*a* and a rotor yoke portion 40*b* such that, with the pair of inner and outer salient poles 42, 44 therebetween, the rotor yoke portion 40 on the −θ side is referred to as "rotor yoke portion 40*a* on a first side" and the rotor yoke portion 40 on the +θ side is referred to as "rotor yoke portion 40*b* on a second side", with respect to the pair of inner and outer salient pole 42, 44.

The multilayer rotor coil 47 is diagonally wound in multilayers between the inner circumferential surface of the rotor yoke portion 40*a* on the first side and the outer circumferential surface of the rotor yoke portion 40*b* on the second side, with the pair of inner and outer salient poles 42, 44 therebetween. The diagonal direction is the direction connecting between a (−θ, −R) side and a (+θ, +R) side. The diagonal direction is shown by broken lines in FIG. 3. The diagonal direction is tilted from the extending direction of the pair of inner and outer salient poles 42, 44 about 45 degrees, and also about 45 degrees from the extending direction of the rotor yoke portion 40. The multilayer winding direction is the same as the diagonal direction. In other words, the multilayer winding is arranged along the diagonal direction. The winding direction within a layer (hereinafter referred to as "intralayer winding direction") is the direction perpendicular to the diagonal direction. The intralayer winding directions are shown in solid lines in FIG. 3. The order to diagonally wind the coil in multilayer is that, beginning at the corner at the intersection between the pair of inner and outer salient poles 42, 44 and the rotor yoke portion 40, one turn is wound in the diagonal direction and then, turns are wound in the intralayer winding direction, while the layers are built up in the diagonal direction. The order of windings is numbered as "1, 2, 3 . . . " in FIG. 3.

The beginning of the first turn (numbered "1" in FIG. 3) of the multilayer diagonal winding in FIG. 3 is positioned at the corner at the intersection between the outer salient pole 42 and the outer circumferential surface of the rotor yoke portion 40*b* on the second side. Beginning from this point, the first turn is diagonally wound towards the corner at the intersection between the inner salient pole 44 and the rotor yoke portion 40*a* on the first side.

The second turn (numbered "2" in FIG. 3) and the third turn (numbered "3" in FIG. 3) are wound in a second layer which is one layer further out than the first turn in the diagonal direction. The end of the first turn becomes the beginning of the second layer, which is shifted one turn from the corner at the intersection between the outer salient pole 42 and the outer circumferential surface of the rotor yoke portion 40*b* on the second side in the +R direction towards the tip of the outer salient pole 42. Using this point as the beginning of the second layer, a turn is wound shifted one turn from the first turn in the −θ direction along the inner circumferential surface of the rotor yoke portion 40*a* on the first side, and further wound shifted one turn from the first turn in the +θ direction along the outer circumferential surface of the rotor yoke portion 40*b* on the second side. This becomes the end of the second turn. The end of the second turn becomes the beginning of the third turn (numbered "3" in FIG. 3). Beginning at this point, the third turn is wound shifted one turn from the first turn in the −R direction along the −θ side surface of the inner salient poles 44, and further wound (numbered "4" in FIG. 3) shifted one turn from the beginning of the third turn in the +θ direction along the outer circumferential surface of the rotor yoke portion 40*b* on the second side. This is the end of the third turn becoming the end of the second layer and the beginning of the third layer.

In the example shown in FIG. 3, these procedures are repeated until 13 layers are diagonally wound between the inner circumferential surface of the rotor yoke portion 40*a* on the first side of the rotor yoke portion 40 and the outer circumferential surface of the rotor yoke portion 40*b* on the second side. In this way, a multilayer winding is formed with seven layers in the circumferential direction and seven layers in the radius direction of the rotor yoke portion 40. The number of layers along the circumferential direction of the rotor yoke portion 40 can be appropriately determined within a range not interfering with each other in a space between adjacent pairs of inner and outer salient poles 42, 44 in the θ direction. The number of layers along the radius direction of the rotor yoke portion 40 can be appropriately determined within a range windable between the outer circumferential surface of the rotor yoke portion 40 to the tip surface of the outer salient pole 42 and between the inner circumferential surface of the rotor yoke portion 40 to the tip surface of the inner salient poles 44. These numbers of layers are provided merely as examples. Other numbers of layers and turns are also applicable. Further, any winding methods other than the above are also applicable as long as multilayer windings are formed in a diagonal direction.

In FIG. 3, each arrow shows the direction in which electric current rectified by the rectifying device 50 flows through the rotor coil 47. Respectively referring to the cathode and anode of the rectifying device 50 as "cathode K" and "anode A", the cathode K is connected to the beginning (numbered "1" in FIG. 3) of the rotor coil 47, while the anode A is connected to the end (numbered "49" in FIG. 3) of rotor coil 47.

As shown in FIG. 3, the direction in which the electric current rectified by the rectifying device 50 flows through the rotor coil 47 is the direction of a right hand screw in the radius direction of the pair of inner and outer salient poles 42, 44 from +R to −R. Thus, the outer salient pole 42 becomes the S pole and the inner salient pole 44 becomes the N pole. The same can be said for the single layer winding shown in FIGS. 1 and 2.

The rectifying device 50 is connected between the beginning and the end of the rotor coil 47. The rectifying device 50 ensures that the polarity of the outer salient pole 42 (outer magnetic pole) and the inner salient pole 44 (inner magnetic pole) are opposite to each other. The outer salient pole 42 and the inner salient pole 44 are respectively magnetized by the current of the rotor coils 46 induced by the excitation of the outer stator 12 and the inner stator 14.

Although FIG. 3 specifically shows the magnetic pole pair 48, the winding method of the rotor coil 47 in the diagonal multilayer winding is identical to the magnetic pole pair 49, which is adjacent to the magnetic pole pair 48 along the circumferential direction of the rotor yoke portion 40. A different point is the connection of the rectifying device 51 disposed with the magnetic pole pair 49. The rectifying device 51 of the magnetic pole pair 49 includes an anode A connected to the beginning (numbered "1" in FIG. 3) of the rotor coil 47 and a cathode K connected to the end (numbered "49" in FIG. 3) of the rotor coil 47. In this way, the polarity of the magnetic poles magnetized by the current rectified by the rectifying device 51 becomes N polarity at the outer salient pole 42 and S polarity at the inner salient pole 44.

Regarding the circumferentially-adjacent magnetic pole pairs 48, 49, the rectifying devices 50, 51 ensure that the directions of the N and S magnetic polarities at the inner and outer salient poles 42, 44 are opposite to each other. The same can be said for the single layer winding shown in FIGS. 1 and 2.

By winding the rotor coil 46 in multi-layers in a diagonal direction, the output of the rotating electric machine 10 can be improved in comparison to the case with a single layer.

REFERENCE NUMERALS 10 (magnet-free) rotating electric machine; 12 outer stator; 14 inner stator; 16 annular rotor; 18 output shaft; 20 outer stator yoke portion; 22 outer stator salient pole 22, 24 outer exciting coil; 30 inner stator yoke portion; 32 inner exciting coil; 34 inner stator salient pole; 40 rotor yoke portion; 40a rotor yoke portion (on the first side); 40b rotor yoke portion (on the second side); 42 outer salient pole; 42, 44 pair of inner and outer salient poles; 44 inner salient pole; 46, 47 rotor coil; 48, 49 magnetic pole pair; and 50, 51 rectifying device.

What is claimed is:

1. A magnet-free rotating electric machine comprising:
   an annular outer stator including an outer exciting coil;
   an annular inner stator including an inner exciting coil, the annular inner stator being formed unitedly with the outer stator and disposed inside the outer stator;
   an annular rotor disposed between an inner circumferential side of the outer stator and an outer circumferential side of the inner stator, the annular rotor having:
   an annular rotor yoke portion;
   a plurality of pairs of inner and outer salient poles disposed along a circumferential direction of the rotor yoke portion, each of the inner salient poles and each of the outer salient poles being disposed respectively on an inner circumferential side and an outer circumferential side of the rotor yoke portion and forming a pair; and
   rotor coils, each provided for each of the pairs of inner and outer salient poles such that the rotor coil is diagonally wound between an inner circumferential surface of the rotor yoke portion on a first side in the circumferential direction and an outer circumferential surface of the rotor yoke portion on a second side with the pair of inner and outer salient poles sandwiched therebetween; and
   a rectifying element connected between both ends of the rotor coil, the rectifying element ensuring that induced current induced in the rotor coil by excitation of the outer stator and the inner stator is unidirectional, and that polarity of an outer magnetic pole, which is an outer salient pole, and polarity of an inner magnetic pole, which is an inner salient pole, are opposite to each other, the outer magnetic pole and the inner magnetic pole being magnetized by the induced current,
   wherein the rectifying element ensures that NS magnetic pole directions of circumferentially-adjacent pairs of the inner and outer salient poles are opposite to each other.

2. The magnet-free rotating electric machine according to claim 1, wherein
   the rotor coil is wound in multi-layers for a predetermined number of layers along a diagonal direction.

3. The magnet-free rotating electric machine according to claim 1, wherein a single common rectifying element is used for the pairs of inner and outer salient poles which have the same NS magnetic pole direction among the plurality of pairs of inner and outer salient poles.

4. The magnet-free rotating electric machine according to claim 2, wherein
   a single common rectifying element is used for the pairs of inner and outer salient poles which have the same NS magnetic pole direction among the plurality of pairs of inner and outer salient poles.

* * * * *